United States Patent [19]
Radigan

[11] Patent Number: 6,031,994
[45] Date of Patent: Feb. 29, 2000

[54] METHOD FOR DETERMINING THE SET OF VARIABLES THAT MAY BE AMBIGUOUSLY DEFINED AT A POINT IN A COMPUTER PROGRAM

[75] Inventor: Jim J. Radigan, San Jose, Calif.

[73] Assignee: Intel Corporation, Santa Clara, Calif.

[21] Appl. No.: 08/831,159

[22] Filed: Apr. 1, 1997

[51] Int. Cl.[7] .................................................. G06F 7/04
[52] U.S. Cl. .................................................. 395/709
[58] Field of Search ........................................... 395/709

[56] References Cited

U.S. PATENT DOCUMENTS

| | | | |
|---|---|---|---|
| 4,435,753 | 3/1984 | Rizzi ..................................... | 395/709 |
| 4,567,574 | 1/1986 | Saadé ................................... | 395/709 |
| 4,656,582 | 4/1987 | Chaitin et al. ......................... | 395/709 |
| 4,656,583 | 4/1987 | Auslander et al. .................... | 395/707 |
| 4,710,872 | 12/1987 | Scarborough ........................ | 395/707 |
| 4,773,007 | 9/1988 | Kanada et al. ........................ | 395/709 |
| 4,782,444 | 11/1988 | Munshi et al. ........................ | 395/709 |
| 4,821,181 | 4/1989 | Iwasawa et al. ...................... | 395/500 |
| 4,833,606 | 5/1989 | Iwasawa et al. ...................... | 395/709 |
| 4,885,684 | 12/1989 | Austin et al. .......................... | 395/706 |
| 4,907,151 | 3/1990 | Bartlett ................................. | 711/166 |
| 4,965,724 | 10/1990 | Utsumi et al. ........................ | 395/707 |
| 5,287,510 | 2/1994 | Hall et al. ............................. | 395/709 |
| 5,854,933 | 12/1998 | Chang .................................. | 395/709 |

OTHER PUBLICATIONS

Alfred V. Aho, Revi Sethi, and Jeffrey D. Ullman, *Compilers–Principles, Techniques, and Tools,* (Addison–Wesley Publishing Co. 1988), in toto.

Ron Cytron, Jeanne Ferrante, Mark N. Wegman, Barry K. Rosen, and F. Kenneth Zadeck, "An Efficient Method of Computing Static Single Assignment Form" available from the Brown University Department of Computer Science as Technical Report No. CS–88–16 at techreports@cs.brown.edu or through http:/www.cs.brown.edu:80/techreports/reports/CS–91–21.html, in toto.

Ron Cytron, Jeanne Ferrante, Mark N. Wegman, Barry K. Rosen, and F. Kenneth Zadeck, "Efficiently Computing Static Single Assignment Form and the Control Dependence Graph," 13 ACM Transactions on Programming Languages and Systems (1991); also available from the Brown University Department of Computer Science as Technical Report No. CS–91–21 at techreports@cs.brown.edu or through http:/www.cs.brown.edu:80/techreports/reports/CS–91–21.html, in toto.

Mark N. Wegman and F. Kenneth Zadeck, "Constant Propagation with Conditional Branches," presented at the Twelfth Annual ACM Symposium on Principles of Programming Languages, sponsored by the Special Interest Group on Automata and Computability Theory and the Special Interest Group on Programming Languages of the Association for Computing Machinery, Jan. 14–16, 1985, in New Orleans, Louisiana, available from ACM Press and from the Brown University Department of Computer Science as Technical Report No. CS–91–22 at techreports@cs.brown.edu or through http:/www.cs.brown.edu:80/techreports/reports/CS–91–22.html, in toto.

(List continued on next page.)

*Primary Examiner*—Emanuel Todd Voeltz
*Assistant Examiner*—John Q. Chavis
*Attorney, Agent, or Firm*—Blakely, Sokoloff, Taylor & Zafman LLP

[57] ABSTRACT

A computer implemented method for determining the set of variables that may be ambiguously defined at a point in a computer program includes first placing all variables contained in at least a portion of the computer program into the set. Next, a definition of a variable in at least a portion of the computer program is located. Then, if the definition unambiguously defines the variable, then the variable is removed from the set. Otherwise, if the definition is an ambiguous definition, then all the variables contained in the portion of the computer program are placed into the set.

44 Claims, 5 Drawing Sheets

OTHER PUBLICATIONS

Kathleen Knobe and Kenneth Zadeck, "Register Allocation Using Control Trees," available from the Brown University Department of Computer Science as Technical Report No. CS–92–13 at techreports@cs.brown.edu or through http://www.cs.brown.edu:80/techreports/reports/CS–92–13.html, in toto.

Eric Stoltz, Harini Srinivasan, James Hook, and Michael Wolfe, "Static Single Assignment Form for Explicitly Parallel Programs: Theory and Practice," available at http:\\www.cse.ogi.edu/Sparse/sparse.papers.html, in toto.

Barry K. Rosen, Mark N. Wegman, and F. Kenneth Zadeck, "Global Value Numbers and Redundant Computations," presented at the Fifteenth Annual ACM Symposium on Principles of Programming Languages, sponsored by the Special Interest Group on Automata and Computability Theory and the Special Interest Group on Programming Languages of the Association for Computing Machinery, Jan. 13–15, 1988, in San Diego, California, available from ACM Press, in toto.

Fred C. Chow and John L. Hennessy, "The Priority–Based Coloring Approach to Register Allocation," 12 ACM Transactions on Programming Languages and Systems 501 (Association for Computing Machinery 1990), in toto.

Gregory J. Chaitin, Marc A. Auslander, Ashok K. Chandra, John Cocke, Martin E. Hopkins, and Peter W. Markstein, "Register Allocation via Coloring," 6 Computer Languages 47 (Pergamon Press Ltd. 1981), in toto.

G. J. Chaitin, "Register Allocation & Spilling via Graph Coloring," Proceedings of the Sigplan '82 Symposium on Compiler Construction, presented Jun. 23–25, 1982, in Boston, Massachusetts, sponsored by the Association for Computing Machinery Special Interest Group on Programming Languages (ACM Order No. 548820), in toto.

Vugranam C. Sreedhar, Efficient Program Analysis Using DJ Graphs, Ph. D. Thesis, School of Computer Science, McGill Univeristy, Quebec Canada (1995), in toto.

Gagan Agrawal, Joel Saltz, and Raja Das, "Interprocedural Partial Redundancy and its Application to Distributed Memory Compilation," UMIACS and Department of Computer Science at the University of Maryland, in toto.

John H. Reif and Harry R. Lewis, "Efficient Symbolic Analysis of Programs," 32 Journal of Computer and System Sciences 280 (Academic Press, Inc. 1986), in toto.

Mark N. Wegman and F. Kenneth Zadeck, "Constant Propagation with Conditional Branches," 13 ACM Transactions on Programming Languages 181 (1991), in toto.

Gagan Agrawal and Joel Saltz, "Interprocedural Compilation of Irregular Applications for Distributed Memory Machines," (1995), in toto.

Peter Christy, "IA–64 and Merced–What and Why," 10 Microprocessor Rep. 17 (1996), in toto.

Figure 3 for B = 1 to *total_number_of_basic_blocks* do {
    determine *loc_ambig_out*[B] } for B = 1 to *total_number_of_basic_blocks* do {
    determine *loc_unambig_out*[B] } for B = 1 to *total_number_of_basic_blocks* do {
    *ambig_out*[B] = *loc_ambig_out*[B] }

*changes* = true
while *changes* do {
    *changes* = false
    for B = 1 to *total_number_of_basic_blocks* do {

$$ambig\_in[B] = \bigcup_{P=1}^{P=num\_of\_predecessors} ambig\_out[P]$$

*ambig_old_out* = *ambig_out*[B]
        *ambig_out*[B] = *loc_ambig_out*[B] ∪ (*ambig_in*[B] - loc_*unambig_out*[B])
        if *ambig_old_out* != *ambig_out*[B] {
            *changes* = true }}}

METHOD FOR DETERMINING THE SET OF VARIABLES THAT MAY BE AMBIGUOUSLY DEFINED AT A POINT IN A COMPUTER PROGRAM

BACKGROUND OF THE INVENTION

1. Field of the Invention

The invention relates to a computer implemented method for determining the set of variables that may be ambiguously defined at a point in a computer program. This method enables optimizing compilers to efficiently implement certain code-improving transformations.

2. Related Applications

The invention disclosed and claimed herein is related to the following applications:

(1) my co-pending U.S. patent application Ser. No. 08/831,074, filed herewith, entitled "A Method for Constructing a Static Single Assignment Language Accommodating Arbitrarily Complex Symbolic Memory References" (Attorney Docket No. INPA:002|P3497);

(2) my co-pending U.S. patent application Ser. No. 08/829,856, filed herewith, entitled "A Method for Performing Common Subexpression Elimination on a Rank-n Static Single Assignment Language" (Attorney Docket No. INPA:016|P3938);

(3) my co-pending U.S. patent application Ser. No. 08/831,739, filed herewith, entitled "A Method of Using Static Single Assignment to Color Out Artificial Register Dependencies" (Attorney Docket No. INPA:019|P3941);

(4) my co-pending U.S. patent application Ser. No. 08/829,847, filed herewith, entitled "A Method for Identifying Partial Redundancies in Existing Processor Architectures" (Attorney Docket No. INPA:014|P3936);

(5) my co-pending U.S. patent application Ser. No. 08/829,933, filed herewith, entitled "A Method for Identifying Partial Redundancies in a New Processor Architecture" (Attorney Docket No. INPA:021|P4306); and (6) my co-pending U.S. patent application Ser. No. 08/829,980, filed herewith, entitled "A Method for Optimizing a Loop in a Computer Program by Removing Loop-Invariant Loads Outside of a Loop" (Attorney Docket No. INPA:017|P3939).

All of these applications are hereby expressly incorporated by reference for all permissible purposes as if expressly set forth verbatim herein.

DESCRIPTION OF THE RELATED ART

Most computer programmers write computer programs in source code using high-level languages such as C, FORTRAN, or PASCAL. While programmers may easily understand such languages, modern computers are not able to directly read such languages. Thus, such computer programs must be translated into a language, known as machine language, that a computer can read and execute. One step in the translating process is performed by a compiler. A compiler translates a source code program into object code. Object code is a machine language description of a high-level computer program. Object code produced by conventional compiling algorithms may often be made to execute faster. This improvement is called optimization. Compilers that apply code-improving transformations are called optimizing compilers.

Some conventional optimizing compilers translate high-level computer programs into an intermediate language known as a Static Single Assignment (SSA) representation. This SSA intermediate language is used as a basis to perform certain optimizations. After these optimizations are performed, these conventional compilers translate the SSA intermediate language into optimized object code. A deeper explanation of SSA intermediate languages follows and employs the terminology set forth immediately below.

A statement in a computer program is said to "define" a variable if it assigns, or may assign, a value to that variable. For example, the statement "x=y+z" is said to "define" x. A statement that defines a variable contains a "definition" of that variable. In this context, there are two types of variable definitions: unambiguous definitions and ambiguous definitions. Ambiguous definitions may also be called complex definitions.

When a definition consistently defines a particular variable, the definition is said to be an "unambiguous definition" of that variable. For example, the statement, "x=y" always assigns the value of y to x. Such a statement always defines the variable x with the value of y. Thus, the statement "x=y" is an "unambiguous definition" of x. If all definitions of a variable in a particular segment of code are unambiguous definitions, then the variable is known as an unambiguous variable.

Some definitions do not consistently define the same variable. However, these definitions may possibly define different variables at different times in a computer program. Thus, they are called "ambiguous definitions." There are many types of ambiguous definitions and the principal common denominator among the many types is that they are not unambiguous definitions. One type of "ambiguous definition" occurs where a pointer refers to a variable. For example, the statement "*p=y" may be a definition of x since it is possible that the pointer p points to x. Thus, the definition may ambiguously define any variable x if it is possible that p points to x. In other words, *p may define one of several variables depending on the value of p. Another type of ambiguous definition is a call of a procedure with a variable passed by reference. When a variable is passed by reference, the address of the variable is passed to the procedure. Passing a variable by reference to a procedure allows the procedure to modify the variable. Alternatively, variables may be passed by value. When a variable is passed by value, only the value of the variable is passed to the procedure. Passing a variable by value does not allow the procedure to modify the variable. Still another type of ambiguous definition is a procedure that may access a variable because that variable is within the scope of the procedure. Another type of ambiguous definition occurs when a variable is not within the scope of a procedure but the variable has been identified with another variable that is passed as a parameter or is within the scope of the procedure.

When a statement in a computer program references a variable, the statement is said to "use" the variable. For example, the statement "x=y+z" refers to and is said to "use" y and z. Similarly, y and z (but not x) are "used" in the statement "x[y]=z." A statement that uses a variable contains a "use" of that variable.

A definition of a variable "reaches" a use of that variable if that definition is be the last ambiguous or definite definition of that variable prior to the use. Consider the following straight-line C pseudo code.

x=6
x=x+5
x=7
x=x+8

The definition in the first statement "x=6" reaches the use in the second statement "x=x+5." Similarly, the definition in the third statement "x=7" reaches the use in the fourth statement "x=x+8." Note that the definition in the first statement does not reach the use of the fourth statement because x is redefined in the second and third statements.

In the above example, the definitions of x in the second and third statements are said to "kill" the definition of x in the first statement in that they nullify the effects of the definition in the first statement. Only unambiguous definitions of a variable can kill other definitions of the variable. Thus, a use can be reached by both an unambiguous definition and a subsequent ambiguous definition of the same variable.

A computer programmer may address a variable by specifying the variable's location in memory. This location is known as the variable's absolute address. This method of addressing is known as direct addressing. Direct addressing commonly occurs when a variable is specified by its name. For example, in the statement "y=x," both y and x are directly addressed.

A computer programmer may also address a variable by specifying an address that refers to a different address, which may specify yet another address. This method of addressing is known as indirect addressing. Common examples of indirect addressing include pointers, arrays and combinations of pointers and arrays. Examples of indirect addressing include a[i], *p, *(p+4), **p, a[b[i]], and *(*p+4). When a variable is indirectly addressed, at least one indirect memory reference is employed to determine the absolute address of the variable.

A variable may be classified based upon the number of indirect memory references employed to determine the absolute address of the variable. For example, as discussed above, y and x may be directly addressed. Thus, there are zero indirect memory references employed to determine the absolute address of both y and x. These variables are known as rank-0 variables.

A variable employing a single indirect memory reference is known as a rank-1 variable. Examples of rank-1 variables include single pointer references and single array references such as a[i], *p, and *(p+4). A variable that requires two indirect memory references is known as a rank-2 variable. Rank-2 variables include double pointer references and double array references and the combination of a single pointer reference and a single array reference. Examples of rank-2 variables include **p, a[b[i]], and *(*p+4). A rank-n variable employs n indirect memory references to determine the absolute address of the variable.

A definition that defines a rank-n variable is known as a rank-n definition. Similarly a use of a rank-n variable is known as a rank-n use. For example, the definition of the array element b[a[i]] is a rank-0 use of the variable i, a rank-1 use of the array element a[i], and a rank-2 definition of the array element b[a[i]].

Returning to the discussion of SSA intermediate languages, when a computer program is conventionally translated into a SSA intermediate language, each variable definition is given a unique name. Further, all the uses reached by that definition are also renamed to match the variable's new name. For example, consider the straight-line C pseudo code discussed above. When this C pseudo code is translated into a SSA intermediate language, the result would be the following:

$t_1=6$
$t_2=t_1+5$
$t_3=7$
$t_4=t_3+8$

The symbols $t_1$ through $t_4$ represent compiler temporaries. Compiler temporaries are also known by those skilled in the art as temps. Unlike most variables, temps have only a single definition. Because a temp has only a single definition, it may not be defined by an ambiguous definition. Thus, temps are unaliasable scalars. Because temps are unaliasable scalars, an expression using $t_1$ has a different symbolic meaning from the symbolic meaning of an otherwise identical expression using i. Every use of i cannot be considered equal because i represents an aliasable variable. However, every use of $t_1$ can be considered equal. While a compiler may not be able to determine the value contained in a temp, every use of that temp will return the same unknown value. Therefore, temps dramatically simplify certain compiler algorithms.

Unlike the above straight-line C pseudo code, programs typically also contain branch statements. A branch statement is a statement that selects one set of statements from a number of alternative sets of statements. For example, consider the following if-then-else statement:

if (p) then $\{x = 4\}$ else $\{x = 6\}$ $x = 2 + x$

The flow of control through this code segment during execution will branch depending on whether p is true or false and will unite again at the statement "x=z*x." The point where the flow of control branches is known as the "branch point" and the point where it unites is known as the "join point" or the "confluence point."

When this C pseudo code is translated into a SSA intermediate language, the result would be the following:

if (p) then $\{t_1 = 4\}$ else $\{t_2 = 6\}$ $t_3 = \Phi(t_1, t_2)$ $t_4 = 2 + t_3$ Depending on the value of p, either $t_1$ will be defined as 4 or $t_2$ will be defined as 6. In order to "join" these two definitions, a special definition called a phi-function is inserted at the "join point" where the branches join. Phi-functions are known by those skilled in the art.

The above phi-function contains two operands. An operand is a quantity that enters into (or results from) an operation. The operands indicate which definitions reach the join point. In this example, both $t_1$ and $t_2$ reach the join point. Thus, both $t_1$ and $t_2$ are operands to the phi-function that defines $t_3$. As shown above, subsequent uses of x in the original program would use $t_3$ in the corresponding SSA intermediate language.

U.S. patent application Ser. No. 08/829,856, filed on even date herewith, describes a method of creating a rank-n SSA intermediate language from a rank-(n−1) SSA intermediate language, where n is a positive integer. The method includes searching the rank-(n−1) SSA intermediate language for rank-1 definitions that reach at least one use and renaming the rank-1 definitions and the at least one use. By repetitively performing this method, increasingly more complex symbolic expressions may be incorporated into an SSA intermediate language. A rank-n SSA intermediate language provides a uniquely simple framework for performing many optimizations such as those described in the applications incorporated by reference above.

However, in order to perform certain of the above optimizations, a method for determining the set of variables that may be ambiguously defined at a point in a computer program is needed. Previous optimizing compilation techniques only determine the set of variables that may be unambiguously defined at a point in a computer program. These techniques are known in the art as "propagating" unambiguous variables. However, because ambiguity has always been an impediment to optimization, there are no techniques for propagating ambiguity. It is now desirable for certain new optimization techniques such as those disclosed in the related applications incorporated by reference above to determine quickly whether ambiguity is present. More particularly, a compiler may need to know what variables are ambiguously defined at a particular point in a program. Thus, the need for a technique to propagate ambiguity.

SUMMARY OF THE INVENTION

A computer implemented method for determining the set of variables that may be ambiguously defined at a point in a computer program includes placing all variables contained in at least a portion of the computer program and into the set and locating a definition of a variable in at least a portion of the computer program. If the definition unambiguously defines the variable, then the variable is removed from the set. If the definition is an ambiguous definition, then all the variables contained in the portion of the computer program are placed into the set.

BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings.

DETAILED DESCRIPTION OF PARTICULAR EMBODIMENTS

Numerous specific details are set forth below in the detailed description of particular embodiments in order to provide a thorough understanding of the present invention. However, one of ordinary skill in the art having the benefit of this disclosure will understand that the present invention may be practiced without many of the details presented since such details will be necessary or useful depending on the particular embodiment being employed. Conversely, in other instances, well known details have not been described in detail for the sake of clarity so as not to obscure the invention. It will be appreciated that supplying such details would be a routine undertaking for those of ordinary skill in the art, even if a complex and time-consuming task, given the benefit of this disclosure.

In order to perform certain optimizations on a computer program, certain information about the computer program needs to be determined for various points in the computer program. A point in a computer program occurs just before or just after a computer statement. For example, one may refer to the point between two adjacent statements. Alternatively, one may refer to a point just before or just after a statement.

Figure 1:
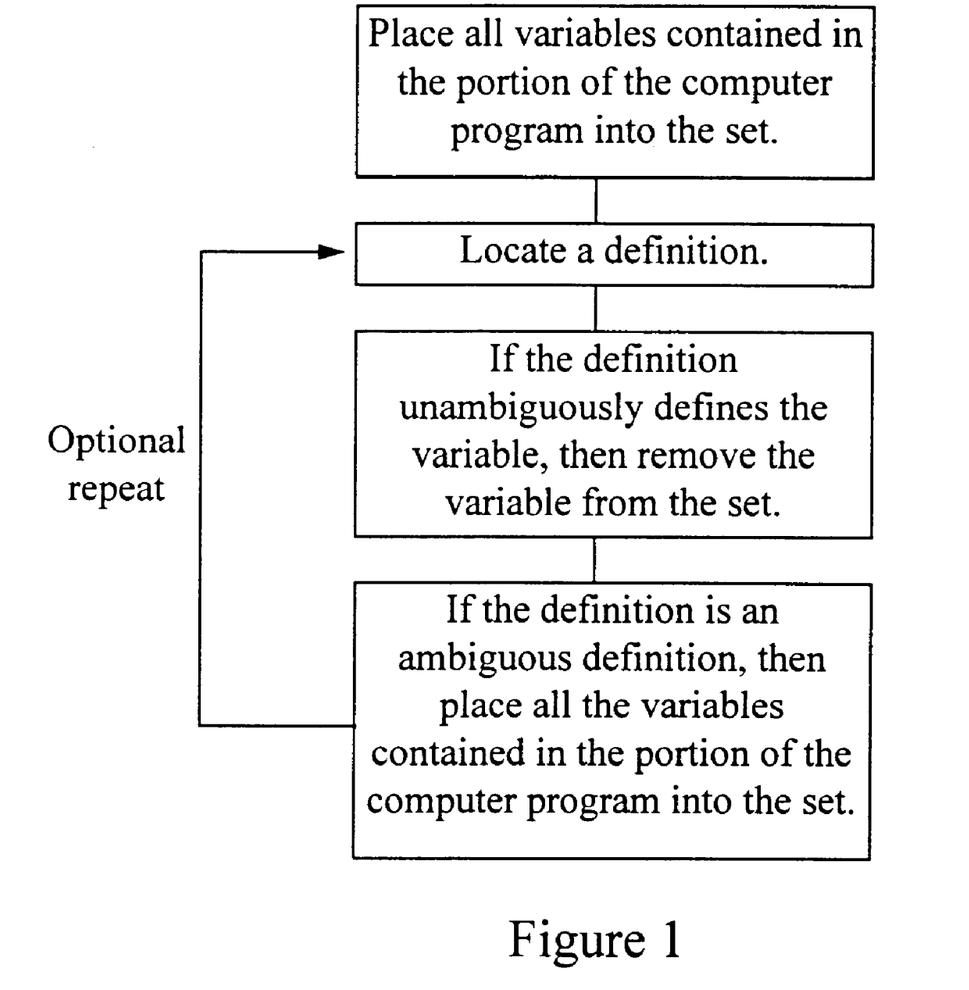
FIG. 1 is a flowchart illustrating an embodiment of a method for determining the set of variables that may be ambiguously defined at a point in a portion of a computer program in accordance with the invention.

Recently, optimizations on rank-n SSA intermediate languages have been developed. Some such optimizations utilize knowledge of the set of variables that may be ambiguously defined at a point in a computer program. A method to determine the set of variables that may be ambiguously defined at a point in a computer program follows. FIG. 1 presents a flowchart for one embodiment of this method. The embodiment presented in FIG. 1 may be applied to a portion of a computer program such as a subroutine or a procedure the statements in one or more basic blocks. In addition, the method may be applied to the entire computer program.

Referring to FIG. 1, the variables that are used and/or defined in a portion of a computer program are initially placed in the set of variables that may be ambiguously defined. The variables that are used and/or defined in a portion of a computer program will be referred to as the variables that are contained in the portion of a computer program. Because temps cannot be ambiguously defined, temps typically are not included in the above set.

While the above act is not always required, the act is typically performed in an effort to be conservative, i.e., safe. For example, it may not be known whether some or all of the variables contained in the portion of a computer program were previously ambiguously defined. Thus, it is conservative to initially assume that all variables contained in the portion of the computer program may be ambiguously defined. Otherwise, if all variables were not assumed to be ambiguously defined, some variables may be inadvertently omitted.

Next, a definition of a variable in the portion of the computer program is located. Typically, definitions are located sequentially. Thus, the first definition located would be the first definition in the portion of a computer program.

The located definition may unambiguously define a variable or may contain an ambiguous definition. If the located definition unambiguously defines a variable, then that variable is removed from the set of variables that may be ambiguously defined. The variable may be removed because the unambiguous definition kills and nullifies the effect of any prior ambiguous definitions of that variable. On the other hand, if the definition contains an ambiguous definition then the variables contained in the portion of the computer program are placed into the set of variables that may be ambiguously defined. The variables contained in the portion of the computer program may be added to the set because an ambiguous definition typically may define any variable in the portion of a computer program that contains the definition.

After updating the set of variables that may be ambiguously defined as discussed above, another definition may be located. Depending on whether this definition contains an ambiguous definition or an unambiguous definition, the set may be updated as discussed above. The set of variables that may be defined may be repeatedly updated as shown in FIG. 1.

The above described method may be applied to the following straight-line pseudo code.

$A[t_1]=t_2*8$ $t_2=e+t_1$ $x=a+b$ $*p=4+(x*y)$ $y=c$ $x=c+a$

The above straight line pseudo code contains six definitions. Each definition except the fourth definition is an unambiguous definition. The fourth definition is an ambiguous definition. Using the embodiment of FIG. 1, the set of variables that may be ambiguously defined at a point just after each definition will be determined.

Referring to FIG. 1, the variables contained in the above pseudo code are initially placed in the set of variables that may be ambiguously defined. Thus, at the point just prior to the first statement in the above pseudo code, the set of variables that may be ambiguously defined includes: $A[t_1]$, e, x, a, b, y, and c. Note that the temps $t_1$ and $t_2$ are not contained in the set of variables that may be ambiguously defined. Recall that a temp, by definition, cannot be ambiguously defined. Note also that $*p$ is not included in the set. While $*p$ points to a variable, $*p$ is not, in itself, a variable.

Next, a variable definition is located. The first variable definition in the above pseudo code defines $A[t_1]$. Because this definition unambiguously defines $A[t_1]$, $A[t_1]$ is removed from the set. Thus, at the point just after the first definition in the above pseudo code, the set of variables that may be ambiguously defined includes: e, x, a, b, y, and c.

After the set of variables that may be ambiguously defined is updated as discussed above, another variable definition is located. In the above pseudo code, the next variable definition defines x. (Note that the definition of $t_2$ is a temp definition and, hence, not a variable definition.) Because x is unambiguously defined, x is removed from the set. Thus, at the point just after the definition of x, the set of variables that may be ambiguously defined includes: e, a, b, y, and c.

Next, still another variable definition is located. In the above pseudo code, the next definition defines $*p$. This definition is an ambiguous definition. Therefore, all variables contained in the pseudo code are placed into the set of variables that may be ambiguously defined. Thus, at a point just after the definition of $*p$, the set of variables that may be ambiguously defined includes: $A[t_1]$, e, x, a, b, y, and c.

The next variable definition in the above pseudo code unambiguously defines y. Thus, at a point just after this definition of y, the set includes: $A[t_1]$, e, x, a, b, and c. Similarly, at a point just after the last definition, the set includes $A[t_1]$, e, a, b, and c.

Figure 2:
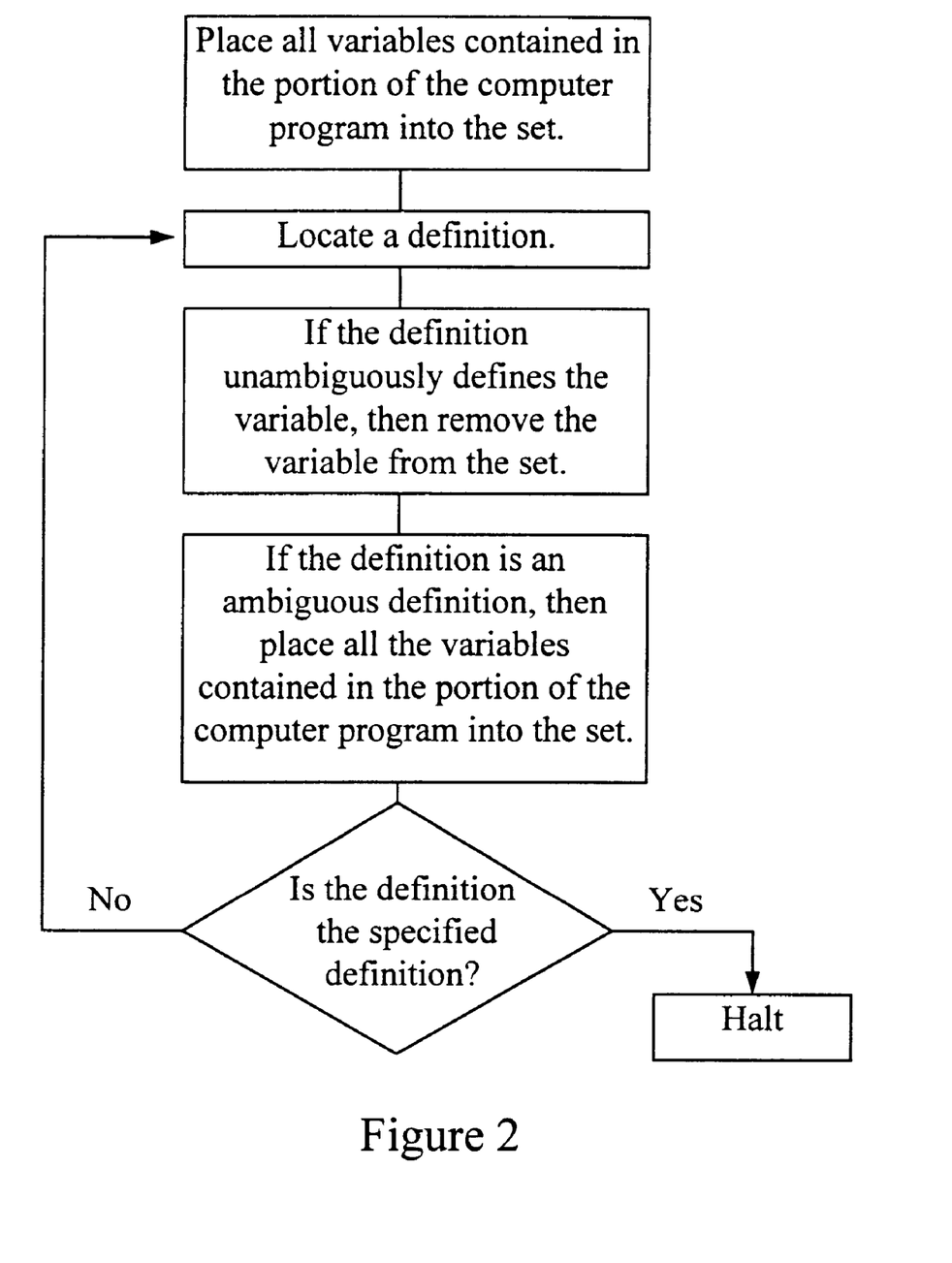
FIG. 2 is a flowchart illustrating an embodiment of a method for determining the set of variables that may be ambiguously defined at a point just after a specified definition in a portion of a computer program in accordance with the invention.

A variation of the above embodiment may be utilized to determine the set of variables that may be ambiguously defined at a point just after a specified definition in a portion of a computer program. FIG. 2 is a flowchart of such an embodiment.

Referring to FIG. 2, the variables that are contained within a portion of a computer program are initially placed in the set of variables that may be unambiguously defined. Next, a definition of a variable in the portion of the computer program is located. If the located definition unambiguously defines a variable, then the variable is removed from the set of variables that may be ambiguously defined. On the other hand, if the located definition is an ambiguous definition, then all the variables contained in the portion of the computer program are placed into the set of variables that may be ambiguously defined. As shown in FIG. 2, if the definition is the specified definition, then this particular embodiment halts in accordance with the invention. Otherwise, another definition is located and the set of variables that may be ambiguously defined is updated accordingly. This cycle may continue until the specified definition is located.

The embodiment described above determines the set of variables that may be ambiguously defined at a point just after a specified statement. Another embodiment may be used to determine the set of variables that may be ambiguously defined at a point just before a specified statement. Such an embodiment is presented in FIG. 3. In this embodiment, the set of variables that may be ambiguously defined is updated only if the located definition is not the specified definition.

The above embodiments may be applied to an entire computer program or any portion of a computer program. However, it may be desirable to apply the above methods to the statements contained within a basic block. A basic block is a sequence of consecutive statements in a computer program in which flow of control enters at the beginning and leaves at the end without halt or possibility of branching except at the end. Basic blocks are known by those skilled in the art.

The above described sets of variables may be stored in one or more data structures in a computer memory. For example, the set of variables that may be ambiguously defined may be compactly stored using vectors or even bit vectors. A vector is a one dimensional array. A bit vector is a one dimensional array of bits. If a bit vector is used, then a position in the bit vector may be assigned to each variable contained in the computer program or in a portion of the computer program. The bit vector representing the above set may have a 1 in position i if and only if the variable assigned to position i is in the set of variables that may be ambiguously defined.

Figure 3:
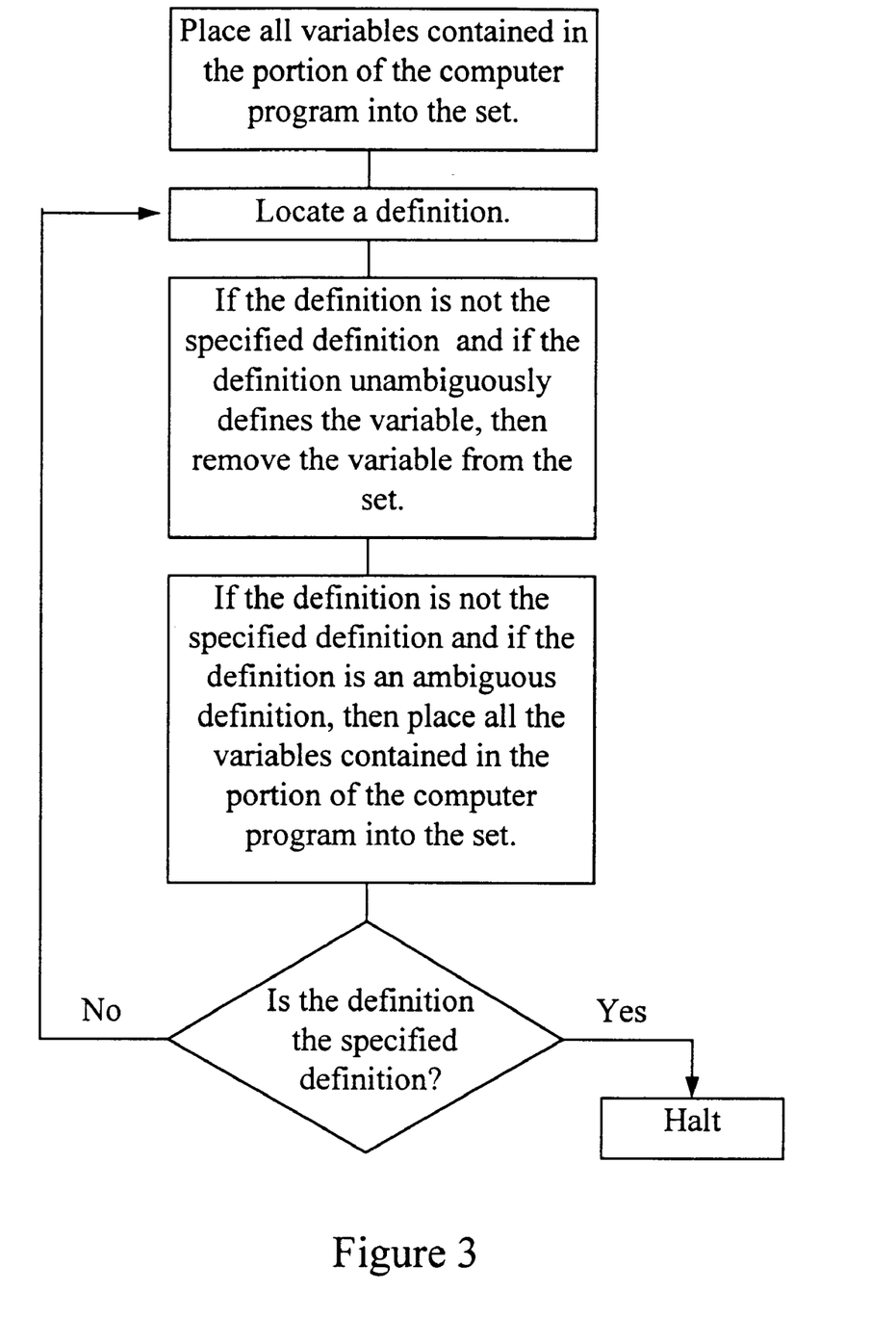
FIG. 3 is a flowchart illustrating an embodiment of a method for determining the set of variables that may be ambiguously defined at a point just before a specified definition in a portion of a computer program in accordance with the invention.

The embodiment shown in FIGS. 1, 2, and 3 determine the set of variables that may be ambiguously defined in a portion of a computer program in accordance with the invention. These portions of a computer program typically do not contain conditional constructs. A conditional construct is a statement or part of a statement that specifies several different execution sequences. Examples of conditional constructs include: if, while, goto, switch, repeat, call, and return. A more efficient embodiment for determining the set of variables that may be ambiguously defined in a complex computer program in accordance with the invention is presented in FIG. 4.

Storage space for storing computer program information may be significantly reduced by saving information only at certain points and, as needed, re-computing such information at intervening points. Thus, in an effort to minimize storage space, basic blocks may be treated as a unit and such information may be stored for the point just before the first statement in a basic block. When information within a basic block is needed, the information may be computed utilizing embodiments in accordance with the invention such as shown in FIGS. 2 and 3. Because computer programs typically contain many more points than basic blocks, a significant space savings may be accomplished.

Figure 4:
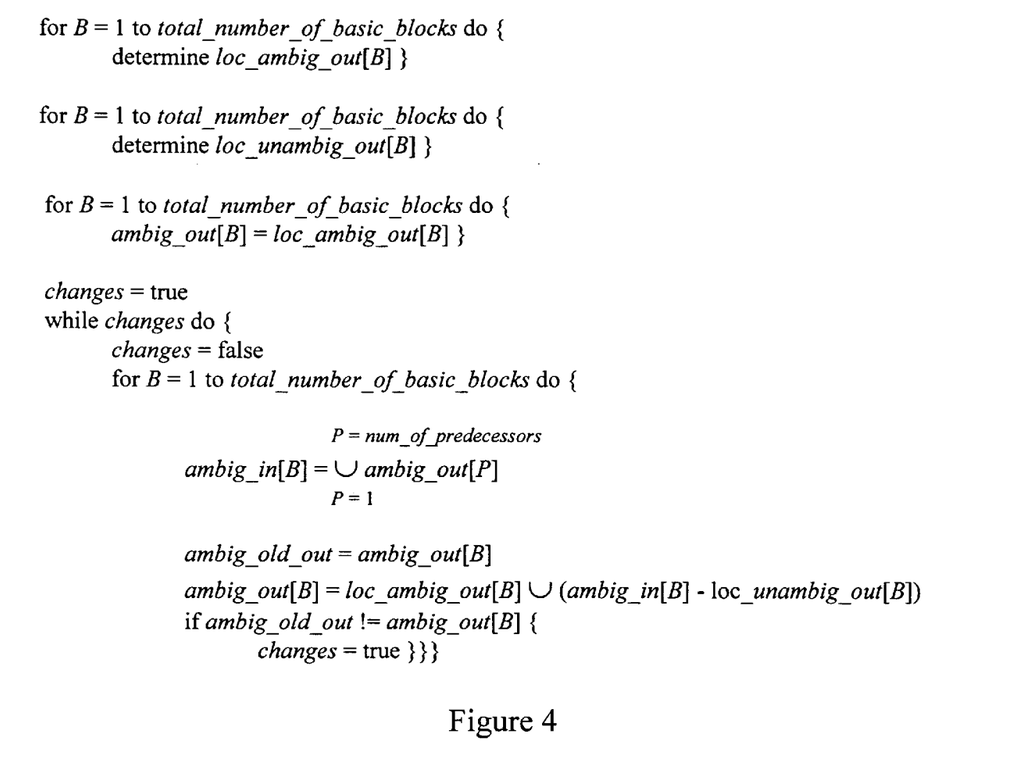
FIG. 4 is a sample computer code segment illustrating an embodiment of a method for determining the set of variables that may be ambiguously defined at a point just before a specified basic block in a computer program in accordance with the invention.

Before discussing the embodiment presented in FIG. 4, several sets of variables will be designated. Each of these sets may be placed in a data structure such as an array of bit vectors. Typically, each basic block in a computer program will have a separate bit vector for each of the following sets of variables. Thus, a set loc_ambig_out for the 5th basic block in a computer program may be represented as loc_ambig_out[5].

A first set is loc_ambig_out. This set contains the variables that may be ambiguously defined, by a statement within a basic block, at a point just after the last statement in the basic block. A second set is loc_unambig_out. This set contains the variables that are unambiguously defined, by a statement within a basic block, at point just after the last statement in the basic block. These two sets only take into account the definitions contained within a single basic block, i.e., "local definitions."

A third set is ambig_in. This set contains the variables that may be ambiguously defined at a point just prior to the first statement in a basic block. A fourth set is ambig_out. This set contains the variables that may be ambiguously defined at a point just after a basic block. Both of these sets take into account the flow of control throughout the entire computer program. By taking into account the flow of control throughout the entire program, definitions that occur outside of the basic block are considered.

In computer programs with conditional constructs, a particular basic block may have several different predecessor basic blocks. A predecessor basic block of a specified basic block is a basic block that may be executed immediately prior to the specified basic block. Consider the following pseudo code.

if (x = 5) then

{y = 4} else

{z = 6} x = 2 + x

The above pseudo code contains at least three basic blocks. One basic block contains the statement "y=4." A second basic block contains the statement "z=6." A third basic block contains the statement "x=2*x." In this example, the basic block containing "x=2*x" has two predecessor basic blocks, namely: the basic block containing the statement "y=4" and the basic block containing "z=6."

One property of a basic block may be stated as follows. The set of variables that may be ambiguously defined just prior to the basic block is equal to the union of the set(s) of variables that may be ambiguously defined just after the basic block's predecessor basic block(s). This first property may be stated in the following mathematical notation:

$$ambig\_in[B] = \bigcup_{P=1}^{P=num\_of\_predecessors} ambig\_out[P]$$

Another property of a basic block may be stated as follows:
ambig_out[B]=loc_ambig_out[B]∪(ambig_in[B]−loc_unambig_out[B])

Note that both of the above equations depend upon each other. The first equation calculates ambig_in utilizing ambig_out. The second equation calculates ambig_out utilizing ambig_in. One method to determine both ambig_in and ambig_out for all the basic blocks in a computer program is to iteratively solve both equations. Thus, by repetitively calculating ambig_in and then ambig_out for each basic block, an iterative solution may be obtained. Such an embodiment is presented in FIG. 4.

FIG. 4 presents pseudo code for determining the set of variables that may be ambiguously defined at a point just before a basic block in a computer program. The first act shown in FIG. 4 is to determine loc_ambig_out for each basic block. The set loc_ambig_out for a particular basic block may be determined by applying the embodiment shown in FIG. 3 to the statements in the basic block. This embodiment may be repeated for each basic block in the computer program, although the invention's scope is not restricted in this respect.

The second act shown in FIG. 4 is to determine loc_unambig_out for each basic block B. The set loc_unambig_out for a particular basic block may be determined by complementing the bit vector of the set loc_ambig_out for the basic block. Thus, if a bit vector containing the set loc_unambig_out for basic block B contained [101011001], then the bit vector containing the set loc_ambig_out for basic block B would contain [010100110].

Alternatively, in an effort to minimize computer system memory requirements, the set loc_unambig_out may be replaced with ¬loc_ambig_out where ¬ indicates the logical NOT operation. However, where this replacement is utilized, the complement of sets is repetitively determined. Thus, the replacement may increase execution time.

The next act shown in FIG. 4 is to initialize ambig_out for each basic block. The initialization act sets, for each basic block B, ambig_out[B] equal to loc_ambig_out[B]. It is conservative, i.e., safe, to assume that ambig_in[B] is empty for each basic block B. Thus, it may be conservatively assumed that, for each basic block B, ambig_out[B] equals loc_ambig_out[B].

Next, the loop shown in FIG. 4 is performed. The loop includes statements for each of the two properties of basic blocks discussed above. When an iteration of the loop shown in FIG. 4 occurs, the sets ambig_in and ambig_out begin to converge to their desired final values. The loop is repeated until ambig_in and ambig_out have fully converged, i.e., ambig_in and ambig_out have stopped changing. In this particular embodiment, in order to determine when it is desirable to exit the loop, a boolean variable changes is used to record, for each iteration of the loop, whether the set ambig_in has changed for any basic block. When the variable changes is false at the end of the loop, the loop is exited. A more detailed description of the loop follows.

The loop first sets the variable changes to false. Then for each basic block B, a sub-loop is performed. One act in the sub-loop sets ambig_in[B] equal to the union of the predecessor basic blocks of basic block B. Next, variable ambig_old_out is set to ambig_out[B]. Next, ambig_out[B] is set equal to the union of loc_ambig_out[B] and the difference between ambig_in[B] minus loc_unambig_out[B]. Finally, if ambig_old_out is not equal to ambig_out[B], i.e., ambig_out[B] has not converged, then the variable changes is set to true. The loop is repeated until the variable changes is still false at the end of the loop.

The unions of the sets in the equations shown in FIG. 4 may be efficiently determined by the logical OR. The difference first set minus second set may be efficiently determined by taking the complement of the second set and then using the logical AND to compute first set AND ¬ second set.

Still other alternative embodiments are possible. Alternative embodiments may also include, for instance:

(1) identifying and eliminating partial redundancies while constructing the final intermediate language representation such as, for example, is set forth in my co-pending U.S. patent application Ser. No. 08/829,847 entitled "A Method for Identifying Partial Redundancies in Existing Processor Architectures" and in my co-pending U.S. patent application Ser. No. 08/829,933 entitled "A Method for Identifying Partial Redundancies in a New Processor Architecture;"

(2) eliminating common subexpressions such as, for example, is set forth in my co-pending U.S. patent application Ser. No. 08/829,856, entitled "A Method For Performing Common Subexpression Elimination on a Rank-n Static Single Assignment Language;"

(3) coloring out artificial register dependencies such as, for example, is set forth in my co-pending U.S. patent application Ser. No. 08/831,739, filed herewith, entitled "A Method of Using Static Single Assignment to Color Out Artificial Register Dependencies;"

(4) eliminating loop invariant motion such as, for example, is set forth in my co-pending U.S. patent application Ser. No. 08/829,980, filed herewith, entitled "A Method for Optimizing a Loop in a Computer Program by Removing Loop-Invariant Loads Outside of a Loop;" and (5) constructing a rank-n SSA intermediate language representation as set forth in my co-pending U.S. patent application Ser. No. 08/831,074, entitled "A Method for Constructing A Static Single Assignment Language, Accommodating Arbitrarily Complex Symbolic Memory References."

Figure 5:
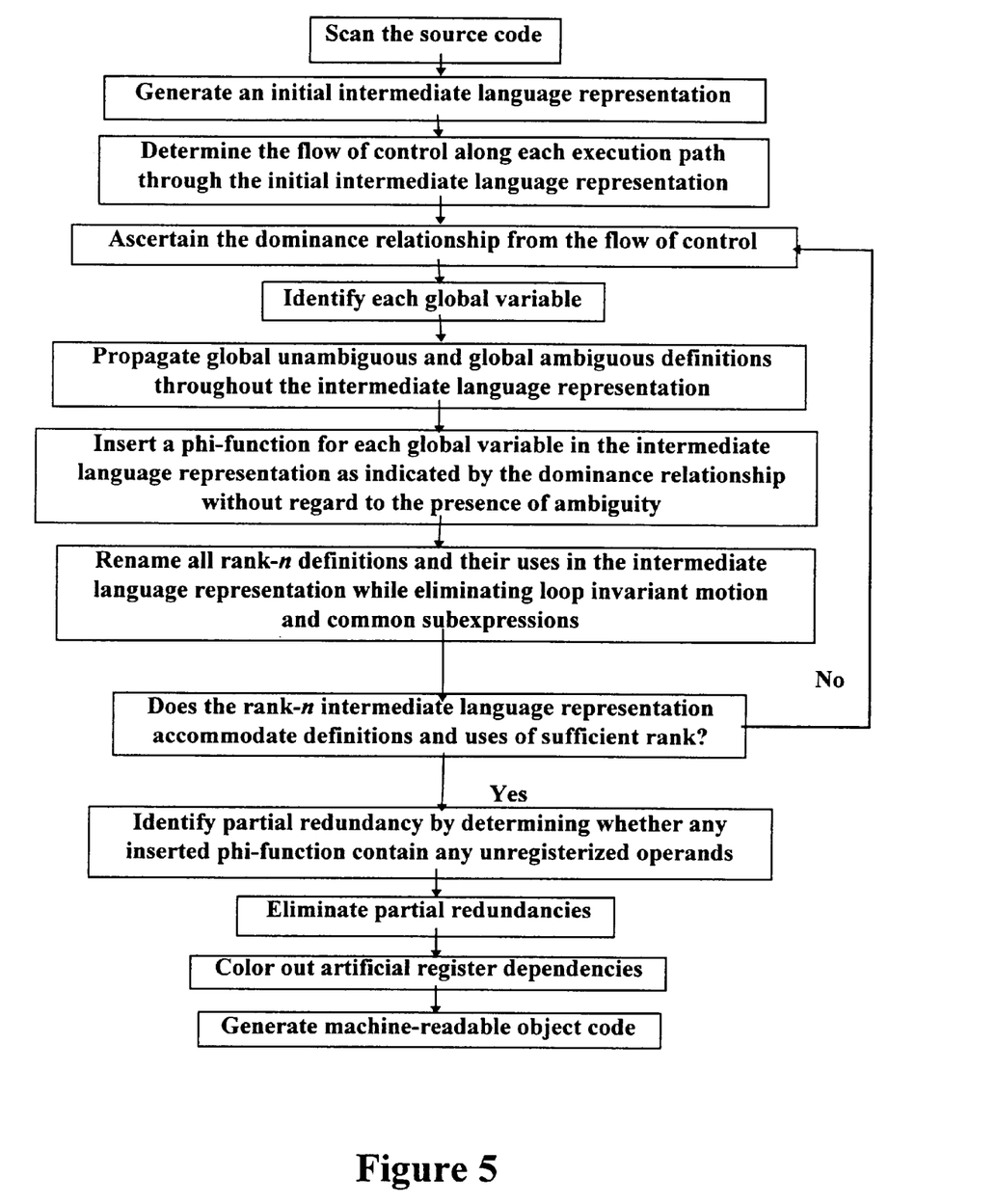
FIG. 5 is a flowchart illustrating an embodiment of a method incorporating a variety of alternative embodiments for the present invention.

Each of these applications was previously incorporated by reference. Indeed, one alternative embodiment of the present invention incorporates all the variations discussed above as set forth in FIG. 5.

Any of the foregoing methods may be implemented by programming a suitable general purpose computer. The programming may be accomplished through the use of a program storage device readable by the general purpose computer and encoding a program of statements executable by the computer for performing the operations described above. The program storage device may take the form of, e.g., one or more floppy disks, a hard disk, a CD ROM or other optical or magnetic-optical disk, a magnetic tape, a read-only memory chip (ROM), and other forms of the kind well-known in the art or subsequently developed. The program of statements may be source code or object code, or a high-level language, or in some intermediate form such as partially compiled code. The precise forms of the program storage device and of the encoding of statements are immaterial.

Another advantage of the above described embodiments is that they preserve the meaning of computer programs. That is, the methods do not change the output produced by a program for a given input or cause an error that was not present in the original version of the computer program. Thus, the methods are "safe" methods.

It will be appreciated by those of ordinary skill having the benefit of this disclosure that the illustrative embodiments described above are capable of numerous variations without departing from the scope and spirit of the invention. While the embodiments are presented utilizing C pseudo code, the methods are not limited to C. The embodiments may be performed on any computer program such as C++, FORTRAN, COBOL, PASCAL, etc. Furthermore, the embodiments may by performed on a computer program written or stored in object code or machine language. Still further, the embodiments may be performed on a computer program stored in an intermediate compiler language that may be utilized to perform other optimizations prior to translation to object code.

Accordingly, the exclusive rights sought herein are as described in the claims below.

What is claimed is:

1. A computer implemented method of determining the set of variables that may be ambiguously defined at a point in a computer program, the method comprising:

(a) placing all variables contained in at least a portion of the computer program into the set;

(b) locating a definition of a variable in at least a portion of the computer program;

(c) if the definition unambiguously defines the variable, then removing the variable from the set; and (d) if the definition is an ambiguous definition, then placing all the variables contained in the at least a portion of the computer program into the set.

2. The method of claim 1 wherein the act of placing all variables contained in the at least a portion of the computer program includes placing all variables in a subroutine in the set.

3. The method of claim 1 wherein the act of placing all variables contained in the at least a portion of the computer program includes placing all variables in a basic block in the set.

4. The method of claim 1 further comprising storing the set in a data structure.

5. The method of claim 1 further comprising storing the set in a vector.

6. The method of claim 1 further comprising storing the set in a bit vector.

7. A computer implemented method of determining the set of variables that may be ambiguously defined at a point just after a specified definition in a computer program, the method comprising:

(a) placing all variables contained in at least a portion of a computer program into the set;

(b) locating a definition of a variable in the at least a portion of a computer program;

(c) if the definition unambiguously defines the variable, then removing the variable from the set;

(d) if the definition is an ambiguous definition, then placing all variables contained in the at least a portion of the computer program into the set; and (e) repeating acts (b) through (d) until the definition is the specified definition.

8. The method of claim 7 wherein the act of placing all variables contained in the at least a portion of the computer program includes placing all variables in a subroutine in the set.

9. The method of claim 7 wherein the act of placing all variables contained in the at least a portion of the computer program includes placing all variables in a basic block in the set.

10. The method of claim 7 further comprising storing the set in a data structure.

11. The method of claim 7 further comprising storing the set in a vector.

12. The method of claim 7 further comprising storing the set in a bit vector.

13. A computer implemented method of determining the set of variables that may be ambiguously defined at a point just before a specified definition in a computer program, the method comprising:

(a) placing all variables contained in at least a portion of a computer program into the set;

(b) locating a definition of a variable in the at least a portion of a computer program;

(c) if the definition is not the specified definition, then
   (i) if the definition unambiguously defines the variable, then removing the variable from the set;
   (ii) if the definition is an ambiguous definition, then placing all variables contained in the at least a portion of the computer program into the set; and (d) repeating acts (b) and (c) until the definition is the specified definition.

14. The method of claim 13 wherein the act of placing all variables contained in the at least a portion of the computer program includes placing all variables in a subroutine in the set.

15. The method of claim 13 wherein the act of placing all variables contained in the at least a portion of the computer program includes placing all variables in a basic block in the set.

16. The method of claim 13 further comprising storing the set in a data structure.

17. The method of claim 13 further comprising storing the set in a vector.

18. The method of claim 13 further comprising storing the set in a bit vector.

19. A computer implemented method of determining a first set of variables that may be ambiguously defined at a point just prior to the first statement in a basic block of a computer program, the method comprising:

(a) determining a second set of variables that may be ambiguously defined at a point just after the last statement in the basic block;

(b) determining a third set of variables that are unambiguously defined at a point just after the last statement in the basic block;

(c) setting a fourth set of variables that may be ambiguously defined at a point just after the basic block equal to the second set; and (d) iteratively solving for the first set and the fourth set.

20. The method of claim 19 wherein the iteratively solving for the first set and fourth set includes:

(i) setting the first set equal to the union of the respective fourth sets for each predecessor basic block of the basic block; and (ii) setting the fourth set equal to the union of the second set and the difference of the first set and the third set.

21. A computer implemented method of determining a first set of variables that may be ambiguously defined at a point just prior to the first statement in a basic block or a computer program, the method comprising:

(a) determining a second set of variables that may be ambiguously defined at a point just after the last statement in the basic block;

(b) setting a third set of variables that may be ambiguously defined at a point just after a basic block equal to the second set; and (c) iteratively solving for the first set and the third set.

22. The method of claim 21, wherein the act of iteratively solving for the first set and the third set includes:

(i) setting the first set equal to the union of the respective third set for each predecessor basic block of the basic block; and (ii) setting the fourth set equal to the union of the second set and the difference of the first set and the complement of third set.

23. A program storage device readable by a general purpose computer, the program storage device encoding statements for a method for determining the set of variables that may be ambiguously defined at a point in a computer program, the method comprising:

(a) placing all variables contained in at least a portion of the computer program into the set;

(b) locating a definition of a variable in at least a portion of the computer program;

(c) if the definition unambiguously defines the variable, then removing the variable from the set; and (d) if the definition is an ambiguous definition, then placing all the variables contained in the at least a portion of the computer program into the set.

24. The device of claim 23 wherein the act of placing all variables contained in the at least a portion of the computer program includes placing all variables in a subroutine in the set.

25. The device of claim 23 wherein the act of placing all variables contained in the at least a portion of the computer program includes placing all variables in a basic block in the set.

26. The device of claim 23 further comprising storing the set in a data structure.

27. The device of claim 23 further comprising storing the set in a vector.

28. The device of claim 23 further comprising storing the set in a bit vector.

29. A program storage device readable by a general purpose computer, the program storage device encoding statements for a method of determining the set of variables that may be ambiguously defined at a point just after a specified definition in a computer program, the method comprising:

(a) placing all variables contained in at least a portion of a computer program into the set;

(b) locating a definition of a variable in the at least a portion of a computer program;

(c) if the definition unambiguously defines the variable, then removing the variable from the set;

(d) if the definition is an ambiguous definition, then placing all variables contained in the at least a portion of the computer program into the set; and (e) repeating acts (b) through (d) until the definition is the specified definition.

30. The device of claim 29 wherein the act of placing all variables contained in the at least a portion of the computer program includes placing all variables in a subroutine in the set.

31. The device of claim 29 wherein the act of placing all variables contained in the at least a portion of the computer program includes placing all variables in a basic block in the set.

32. The device of claim 29 further comprising storing the set in a data structure.

33. The device of claim 29 further comprising storing the set in a vector.

34. The device of claim 29 further comprising storing the set in a bit vector.

35. A program storage device readable by a general purpose computer, the program storage device encoding a method of determining the set of variables that may be ambiguously defined at a point just before a specified definition in a computer program, the method comprising:

(a) placing all variables contained in at least a portion of a computer program into the set;

(b) locating a definition of a variable in the at least a portion of a computer program;

(c) if the definition is not the specified definition, then
   (i) if the definition unambiguously defines the variable, then removing the variable from the set;
   (ii) if the definition is an ambiguous definition, then placing all variables contained in the at least a portion of the computer program into the set; and (d) repeating acts (b) and (c) until the definition is the specified definition.

36. The device of claim 35 wherein the act of placing all variables contained in the at least a portion of the computer program includes placing all variables in a subroutine in the set.

37. The device of claim 35 wherein the act of placing all variables contained in the at least a portion of the computer program includes placing all variables in a basic block in the set.

38. The device of claim 35 further comprising storing the set in a data structure.

39. The device of claim 35 further comprising storing the set in a vector.

40. The device of claim 35 further comprising storing the set in a bit vector.

41. A program storage device readable by a general purpose computer, the program storage device encoding statements for a method of determining a first set of variables that may be ambiguously defined at a point just prior to the first statement in a basic block of a computer program, the method comprising:

(a) determining a second set of variables that may be ambiguously defined at a point just after the last statement in the basic block;

(b) determining a third set of variables that are unambiguously defined at a point just after the last statement in the basic block;

(c) setting a fourth set of variables that may be ambiguously defined at a point just after the basic block equal to the second set; and (d) iteratively solving for the first set and the fourth set.

42. The device of claim 41 wherein the iteratively solving for the first set and fourth set includes:

(i) setting the first set equal to the union of the respective fourth sets for each predecessor basic block of the basic block; and (ii) setting the fourth set equal to the union of the second set and the difference of the first set and the third set.

43. A program storage device readable by a general purpose computer, the program storage device encoding a method of determining a first set of variables that may be ambiguously defined at a point just prior to the first statement in a basic block or a computer program, the method comprising:

(a) determining a second set of variables that may be ambiguously defined at a point just after the last statement in the basic block;

(b) setting a third set of variables that may be ambiguously defined at a point just after a basic block equal to the second set; and (c) iteratively solving for the first set and the third set.

44. The method of claim 43, wherein the act of iteratively solving for the first set and the third set includes:

(i) setting the first set equal to the union of the respective third set for each predecessor basic block of the basic block; and (ii) setting the fourth set equal to the union of the second set and the difference of the first set and the complement of third set.

* * * * *